US012208732B2

(12) United States Patent
Hu et al.

(10) Patent No.: US 12,208,732 B2
(45) Date of Patent: Jan. 28, 2025

(54) AUTOMATICALLY-ADJUSTING MIRROR FOR USE IN VEHICLES

(71) Applicant: NVIDIA Corporation, Santa Clara, CA (US)

(72) Inventors: Feng Hu, Santa Clara, CA (US); Niranjan Avadhanam, Saratoga, CA (US); Ratin Kumar, Cupertino, CA (US); Simon John Baker, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 979 days.

(21) Appl. No.: 16/773,883

(22) Filed: Jan. 27, 2020

(65) Prior Publication Data

US 2021/0229601 A1 Jul. 29, 2021

(51) Int. Cl.

*B60R 1/02* (2006.01)
*B60R 1/072* (2006.01)
*B60R 1/12* (2006.01)

(52) U.S. Cl.

CPC .............. *B60R 1/025* (2013.01); *B60R 1/072* (2013.01); *B60R 1/12* (2013.01); *B60R 2001/1253* (2013.01); *B60R 2300/8006* (2013.01)

(58) Field of Classification Search

CPC ............................... B60R 1/025; B60R 1/072; B60R 1/12; B60R 2300/8006; B60R 2001/1253
USPC .......................................................... 359/843
See application file for complete search history.

(56) References Cited

U.S. PATENT DOCUMENTS 7,354,166 B2 * 4/2008 Qualich .................. B60R 1/081 359/877
9,073,493 B1 * 7/2015 Yun ...................... G02B 7/1827
9,340,157 B2 * 5/2016 Sulc ......................... B60R 1/062
9,598,015 B1 * 3/2017 Pertsel ................. G06V 20/597
2005/0111117 A1 * 5/2005 Qualich .................. B60R 1/081 359/877

(Continued)

FOREIGN PATENT DOCUMENTS

CN 201009817 Y 1/2008
CN 103358997 A 10/2013
CN 106257486 A 12/2016
CN 107074150 A 8/2017

(Continued)

OTHER PUBLICATIONS

International Search Report and Written Opinion for International Application No. PCT/US2021/015254, dated Mar. 25, 2021 (14 pages).

(Continued)

*Primary Examiner* — Ricky D Shafer

(74) *Attorney, Agent, or Firm* — Taylor English Duma L.L.P.

(57) ABSTRACT

Systems and methods for a self-adjusting vehicle mirror. The mirror automatically locates the face of the driver or another passenger, and orients the mirror to provide the driver/passenger face with a desired view from the mirror. The mirror may continue to reorient itself as the driver or passenger shifts position, to continuously provide a desired field of view even as he or she changes position over time. In certain embodiments, the mirror system of the disclosure can be a self-contained system, with the mirror, mirror actuator, camera, and computing device all contained within the mirror housing as a single integrated unit.

25 Claims, 6 Drawing Sheets

10 20 70 90 80 60 110 100 30 50 40

(56) References Cited

U.S. PATENT DOCUMENTS

2009/0079585 A1* 3/2009 Chinomi .................. B60R 1/04 348/E7.086
2011/0122520 A1* 5/2011 Verheyden ............... B60R 1/04 359/843
2013/0258512 A1* 10/2013 Raz .......................... B60R 1/07 359/843
2015/0085116 A1* 3/2015 Graumann ............. B60R 11/04 348/148
2015/0109429 A1* 4/2015 Inoue ....................... A61B 5/18 348/78
2015/0239398 A1* 8/2015 Kaplan .................. B60R 1/006 701/49
2016/0176371 A1* 6/2016 Coleman ................ B60R 1/072 701/49
2019/0381938 A1 12/2019 Hopkins
2020/0369206 A1* 11/2020 Baltaxe .................. B60R 1/072

FOREIGN PATENT DOCUMENTS

GB 2539467 12/2016
GB 2539471 * 12/2016
KR 20110028760 3/2011
WO WO2009156941 12/2009
WO 2011030958 A1 3/2011
WO WO 2011/030958 * 3/2011

OTHER PUBLICATIONS

Hu, Feng; First Office Action for Chinese Patent Application No. 202180004465.2, filed Jan. 4, 2022, mailed Sep. 18, 2023, 11 pgs.
International Preliminary Report on Patentability for PCT Application No. PCT/US2021/015254, filed Jan. 27, 2021, mailed Aug. 11, 2022, 7 pgs.
Hu, Feng; Second Office Action for Chinese Patent Application No. 202180004465.2, filed Jan. 4, 2022, mailed Dec. 18, 2023, 9 pgs.

* cited by examiner

AUTOMATICALLY-ADJUSTING MIRROR FOR USE IN VEHICLES

BACKGROUND

Embodiments of the disclosure relate generally to vehicle mirrors. More specifically, embodiments of the disclosure relate to self-contained and automatically-adjusting mirrors for use in vehicles.

SUMMARY

Development of computer vision-based face detection techniques has led to improvements in a number of technologies. For example, face detection software has been incorporated into products such as cameras, allowing them to automatically focus on faces to reduce the occurrence of undesired blurriness in pictures. Face detection methods may also be incorporated into systems such as vehicle mirrors, to improve the capabilities thereof.

Accordingly, systems and methods are described herein for an automatically-adjusting mirror assembly that, in some embodiments, contains all its components within and/or on a single mirror housing. A mirror, actuator, camera, and computing device are each contained within the mirror housing, and provide mirror self-adjustment capability without need for interacting with any other vehicle systems save for, in some embodiments, electric power input. The camera captures images of, for example, the vehicle driver, and the computing device determines the location of the driver's face within the captured image. The location of the driver's face in the image is then used to determine the location of the driver's face relative to the mirror in three-dimensional space. This point, along with at least one reference point located elsewhere, such as a point on the side of the vehicle, are used to determine the desired orientation of the mirror. The computing device then directs the actuator to position the mirror at the desired orientation. By repeating this process, the mirror system may reposition the mirror at any time, to provide a desired field of view to the driver regardless of the driver's position in the vehicle. In this manner, mirror assemblies of embodiments of the disclosure describe a self-adjusting vehicle mirror that automatically adjusts to provide a desired field of view to the driver even when he or she adjusts position. Certain mirror embodiments also form an enclosed system with all components contained within the same housing as the mirror. This prevents the need for multiple components to be distributed within the vehicle, in turn providing a self-adjusting mirror that is simpler and cheaper than conventional self-adjusting mirror systems. Additionally, as vehicle mirror systems of some embodiments of the disclosure have their own processor, the systems need not burden any vehicle processors with the computational overhead of mirror adjustment calculations.

In one embodiment, a mirror system may have a frame, an articulable mirror, a camera, an actuator capable of articulating the mirror, and control circuitry such as a processor. The mirror, camera, actuator, and control circuitry may each be coupled to the frame, or otherwise placed within a mirror housing that contains the mirror. The processor receives images as captured by the camera, implements face detection processes to determine the location of the driver's face, and calculates a target orientation of the mirror from this location (e.g., a point on the driver's face). The processor then directs the actuator to adjust the mirror to the target orientation.

The target orientation of the mirror may be calculated using one or more points in addition to the face of the driver. For example, target orientation calculation may use the location of another point on or around the vehicle, e.g., a point along a side of the vehicle or a point corresponding to a certain amount of the vehicle shown in the driver field of view presented by the mirror. That is, the processor may determine a target orientation of the mirror such that at least a threshold portion of the vehicle appears in the driver's field of view from the mirror.

The self-adjusting mirror of embodiments of the disclosure may be any mirror within or on a vehicle, such as a side view mirror or a rear view mirror.

The mirror systems of embodiments of the disclosure may retain knowledge of the current mirror orientation, so that determining how to reposition the mirror only requires the mirror target orientation. Alternatively, the current orientation of the mirror need not be retained, but may instead be determined anew whenever a new target orientation is to be calculated. In such embodiments, a reference object may be coupled to the mirror, and a secondary mirror may be added to reflect an image of the reference object into the camera's field of view. The orientation of the reference object in camera images may then be used to determine the current orientation of the mirror.

In further embodiments of the disclosure, image data indicative of an image of a vehicle driver is received and used to determine the position of the driver. The target orientation of the mirror is then determined at least partly according to the driver position, where this target orientation provides the driver with a desired field of view. The mirror is then oriented at the target orientation. The image data may correspond to multiple images of the driver over time, with the above process repeated for each image so that the mirror is re-oriented at intervals of time to track the driver's position as he or she moves over time. That is, the mirror may be adjusted over time to dynamically track drivers as they shift in their seats.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for a self-adjusting vehicle mirror. Using facial detection techniques described in detail below, a mirror system automatically locates the face of the driver or another passenger, and orients the mirror to provide the driver/passenger with a desired view from the mirror. The mirror may continue to reorient itself as the driver or passenger shifts position or posture to continuously provide a desired field of view even as he or she changes position or posture over time. The mirror system of embodiments of the disclosure can be a self-contained system, with the mirror, mirror actuator, camera, and computing device all contained within a shared mirror housing as a single integrated unit. The mirror system of such embodiments of the disclosure does not have components distributed across the vehicle, and is thus simpler, more inexpensive, less taxing on vehicle processors, and easier to service.

Figure 1:
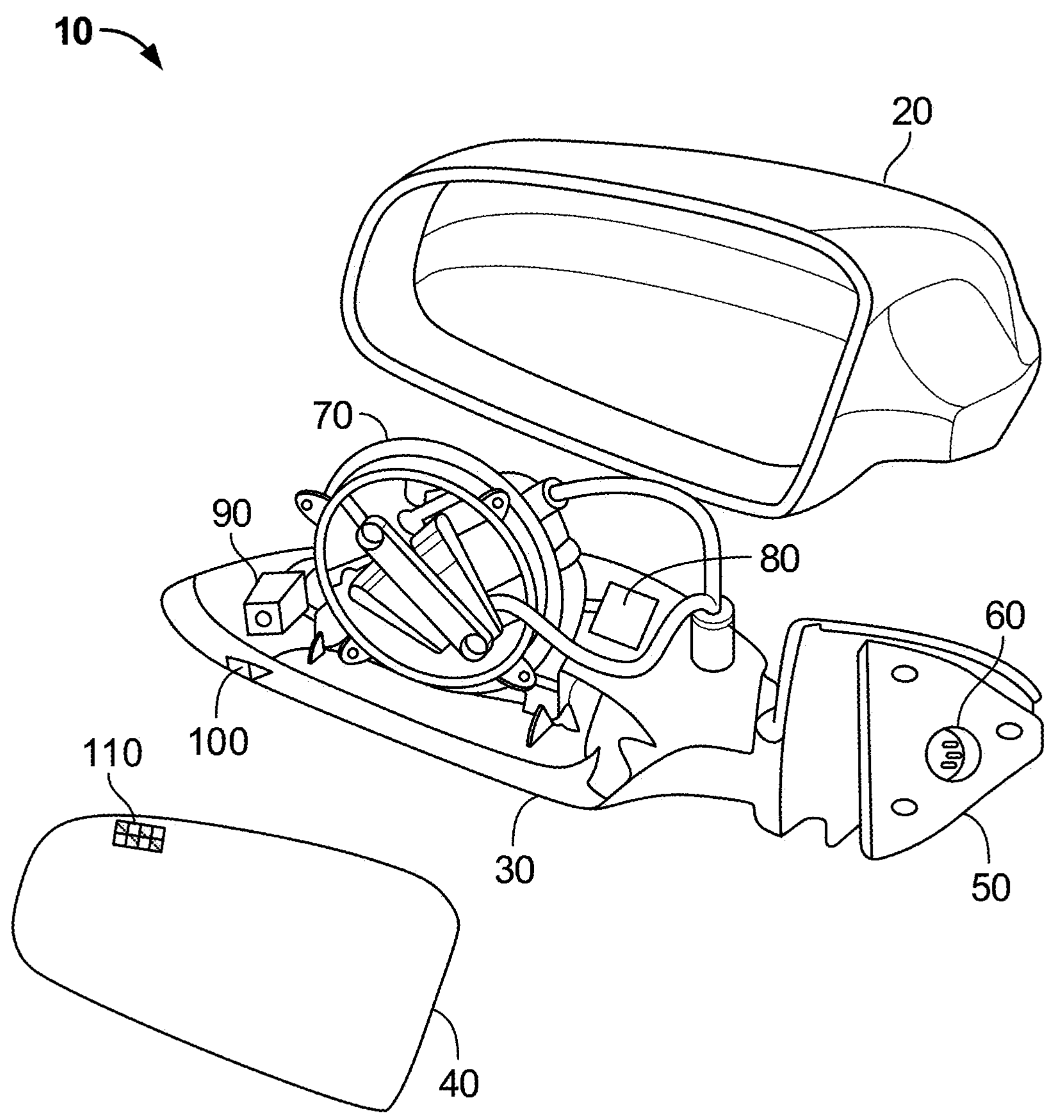
FIG. 1 is an assembly view of a self-contained and automatically adjusting mirror system constructed in accordance with embodiments of the disclosure.

FIG. 1 is an assembly view of a self-contained and automatically adjusting mirror system constructed in accordance with embodiments of the disclosure. Here, mirror assembly 10 includes a housing 20, platform or frame 30, mirror 40, attachment plate 50, electrical interface 60, actuator 70, computing device 80, camera 90, auxiliary mirror 100, and pattern 110. The housing 20 is a rigid structure designed to cover and protect the remaining components, and can be made of any suitable substantially rigid material such as a plastic and/or metal. The platform 30 provides a rigid base or frame upon which many or all of the remaining components are affixed or otherwise coupled. The mirror 40 is a plate of reflective material such as a laminated glass or plastic, which reflects light so as to provide drivers or other passengers within the vehicle a view of portions of the vehicle exterior. The housing 20 and frame or platform 30 are shown here as separate components, but may also be integrally formed as a single component that performs both functions. Attachment plate 50 is a rigid plate with bolt or other fastener holes for affixing the mirror assembly 10 to a vehicle. Attachment plate 50 is typically affixed to the vehicle by fasteners inserted through the holes shown, and the frame 30 is affixed to the attachment plate 50. Attachment plate 50 has an electrical interface 60 which provides an electrical connector or interface between one or more vehicle electrical systems and electrically powered components of mirror assembly 10. For example, electrical interface 60 may provide electrical power to actuator 70, computing device 80, and camera 90 via a vehicle power source such as the vehicle battery. Actuator 70 is secured to frame 30 and is also operably affixed to mirror 40. Actuator 70 may be any actuator capable of rotating and/or translating mirror 40 about any one or more axes to produce an articulable or adjustable mirror 40. Computing device 80 is in electrical communication with both camera 90 and actuator 70 to receive images of the vehicle driver or other passenger from camera 90, locate a face of the driver/passenger in the images and determine its position, calculate a mirror 40 orientation providing the face location with a desired field of view, and orient the mirror 40 accordingly.

Camera 90 may be oriented to capture images of a driver or other passenger, and may be any miniature camera suitable for capturing driver/passenger images of sufficient resolution to locate faces thereof and determine their location. Auxiliary mirror 100 is an angled mirror whose reflective surface is oriented to reflect an image of pattern 110 to camera 90, while also not obscuring the ability of camera 90 to view and capture images of the driver/passenger. Auxiliary mirror 100 and pattern 110 are any mirror and pattern suitable for assisting camera 90 and computing device 80 in determining the current orientation of mirror 40, as further described below.

Figure 2:
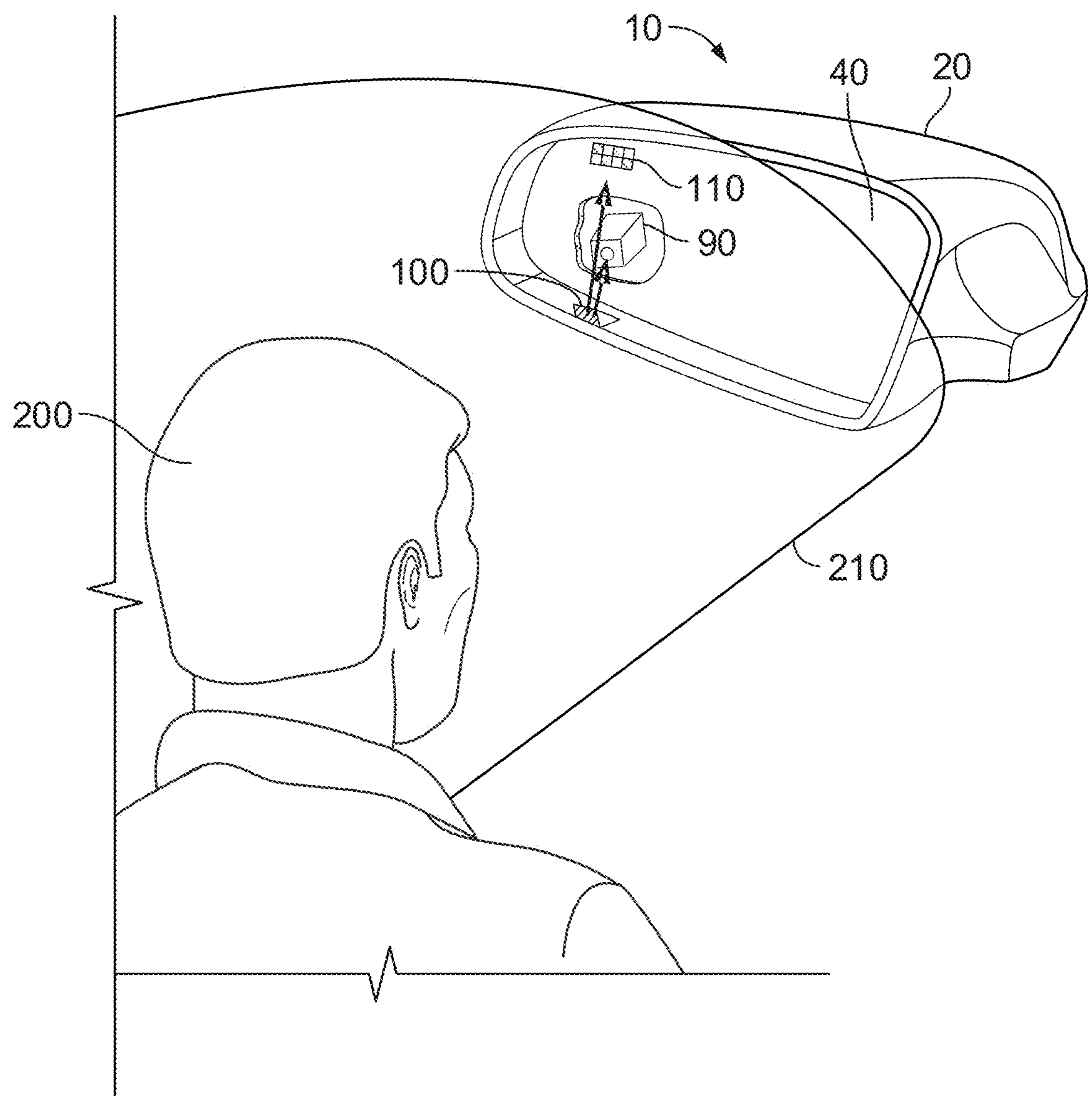
FIG. 2 illustrates operation of a self-contained and automatically adjusting mirror system in accordance with embodiments of the disclosure.

FIG. 2 illustrates operation of mirror assembly 10 in accordance with embodiments of the disclosure. In the embodiment shown, mirror assembly 10 is a vehicle side view mirror affixed to side 210 of a vehicle, although other embodiments of the disclosure contemplate any other type of vehicle mirror such as a rear view mirror. In the embodiment shown, camera 90 is affixed within housing 20 so as to be pointed toward driver 200, to thereby capture images of driver 200. Camera 90 is positioned behind mirror 40 and the mirror 40 may have a gap or opening in its reflective surface as shown, to allow camera 90 to perceive driver 200. Camera 90 may be positioned anywhere on or within housing 20 that allows it a view of driver 200. For instance, camera 90 may be positioned in front of mirror 40, to capture clearer images of driver 200 that are unobstructed by mirror 40.

In operation, camera 90 captures an image that includes both driver 200 and side 210. The image is transmitted to computing device 80, which detects the face of driver 200 in the image and determines a location of the driver's face in three dimensional space relative to the camera 90 or mirror 40. The computing device 80 then calculates a desired orientation of mirror 40 from the location of the face of driver 200 and the location of a point or area of the side 210 of the vehicle.

In embodiments in which the current orientation of mirror 40 is required, camera 90 captures an image of a reference object such as a pattern 110 affixed to mirror 40. More specifically, pattern 110 is affixed to mirror 40 such as by an adhesive, to move with mirror 40. The orientation of pattern 110 thus corresponds to the orientation of mirror 40. Auxiliary mirror 100 is angled to reflect an image of pattern 110 into a portion of the field of view of camera 90, so that images captured by camera 90 contain both an image of the face of driver 200 or another passenger, as well as the reflected image of pattern 110. Images captured by camera 90 thus contain both position information of the face of driver 200 as well as orientation information of the pattern 110 and thus the mirror 40. Computing device 80 thus receives image data from camera 90 corresponding to pixel values of images captured by camera 90, and determines both the location of the face of driver 200 within the image, and the orientation or pose of pattern 110 (and, thereby, that of mirror 40).

While FIGS. 1-2 show mirror system 10 as a self-contained system with mirror 40, actuator 70, processor 80, and camera 90 each contained within the mirror housing 20, one of ordinary skill in the art will realize that this need not necessarily be the case. Embodiments of the disclosure contemplate mirror system 10 configurations in which any one or more of the mirror 40, actuator 70, processor 80, camera 90, auxiliary mirror 100, and pattern 110 are located on the exterior of or external to housing 20. For example, camera 90 may be located within the vehicle cabin for better viewing of driver 200. In such embodiments, it may be preferable for an additional auxiliary camera to be located within housing 20 to view pattern 110 and thereby determine the current orientation of mirror 40. Similarly, processor 80 may be located within the vehicle where it may be less susceptible to damage during collisions, and may more easily access vehicle power.

Figure 3:
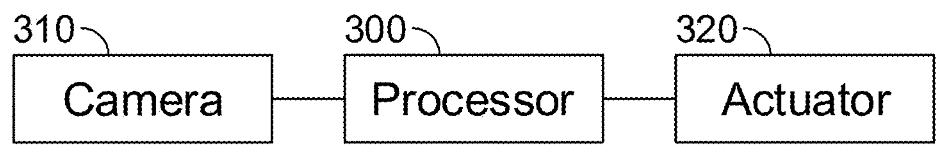
FIG. 3 is a block diagram representation of a self-contained and automatically adjusting mirror system of embodiments of the disclosure.

FIG. 3 is a block diagram representation of an automatically adjusting mirror system of embodiments of the disclosure. FIG. 3 represents components of mirror assembly 10 and their interconnections, in one embodiment of the disclosure. As shown, computing device 300 may correspond to computing device 80 of FIG. 1, while camera 310 and actuator 320 correspond to camera 90 and actuator 70 respectively. Here, computing device 300 is in electronic communication with both camera 310 and actuator 320 to thereby receive image data from camera 310, determine corresponding mirror 40 orientations, and instruct the actuator 320 to move or re-orient mirror 40 accordingly.

Figure 4:
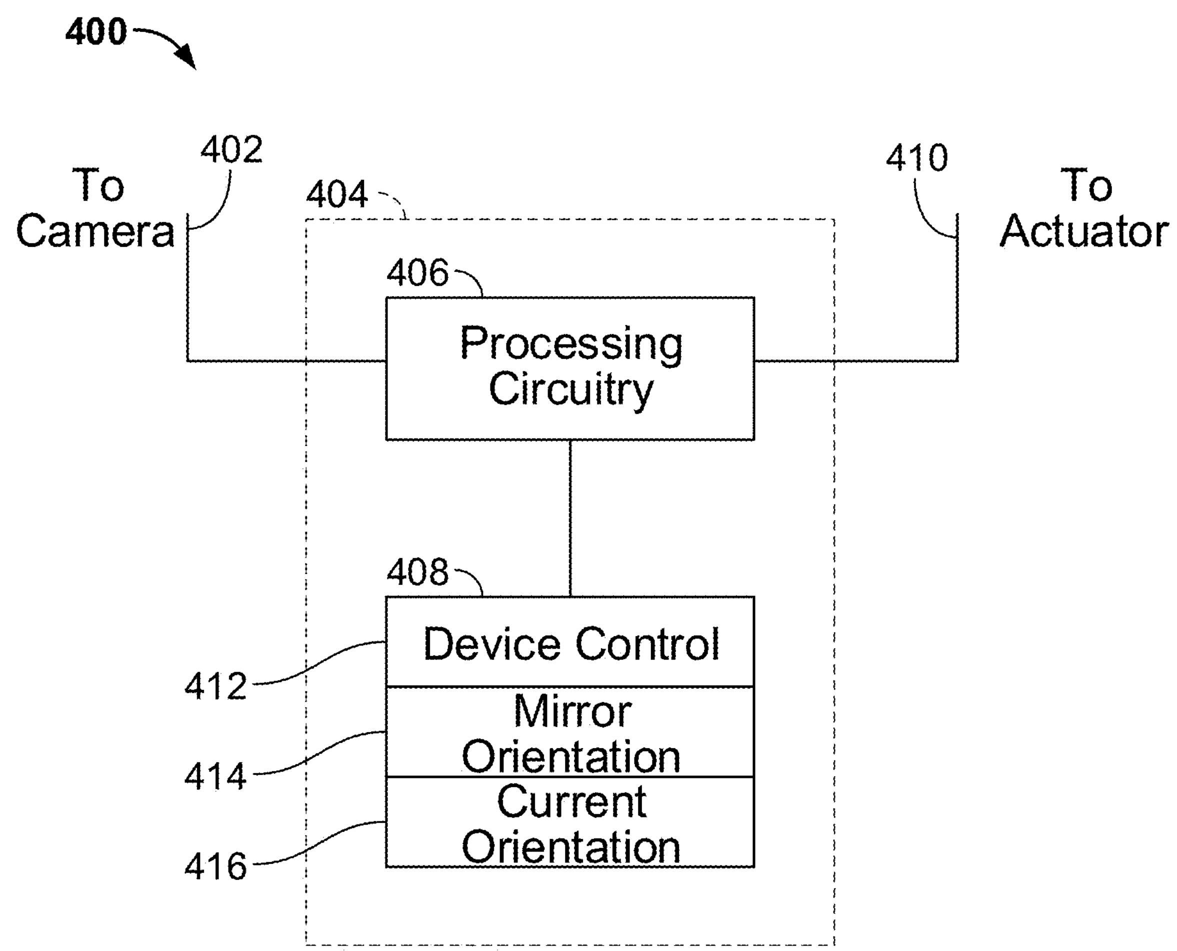
FIG. 4 is a generalized embodiment of an illustrative processor constructed for use according to embodiments of the disclosure.

FIG. 4 is a generalized embodiment of an illustrative electronic computing device constructed for use according to embodiments of the disclosure. Here, computing device 400 is a more detailed representation of computing device 80, and may be any device capable of locating faces in an image, determining locations thereof, calculating corresponding mirror orientations, and directing actuators to orient mirrors accordingly. For example, computing device 400 may be a system on chip (SoC), embedded processor or microprocessor, or the like. Computing device 400 may receive data via input/output (hereinafter "I/O") path 402. I/O path 402 may provide data (e.g., image data from camera 90 or the like) and other input to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths. I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel® Core™ processors) or multiple different processors (e.g., an Intel® Core™ processor and an Intel® Nervana™ processor). Any type and structure of processing circuitry may be employed. For example, processing circuitry 406 may include a multi-core processor, a multi-core processor structured as a graphics or computation pipeline for carrying out operations in parallel, a neuromorphic processor, any other parallel processor or graphics processor, or the like. In at least one embodiment, processing circuitry 406 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor or graphics processor, for example.

In some embodiments, control circuitry 404 executes instructions for detecting faces in images, determining corresponding locations, calculating mirror orientations and instructing actuator 70 to move the mirror 40 accordingly, where these instructions may be embedded instructions or may be part of an application program running on an operating system. In at least one embodiment, computing device 100 may execute a version of the WINDOWS operating system available from Microsoft Corporation of Redmond, Wash., although other operating systems (UNIX and Linux for example), embedded software, and/or graphical user interfaces may also be used.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Storage 408 may be used to store code modules as described below. Nonvolatile memory may also be used (e.g., to launch a boot-up routine and other instructions). Cloud-based storage may be used to supplement storage 408 or instead of storage 408.

Storage 408 may also store instructions or code for the above described operating system and any number of application programs to be executed by the operating system. In operation, processing circuitry 406 may retrieve and execute the instructions stored in storage 408, to carry out the processes herein or to run an operating system and any application programs.

Storage 408 is a memory that stores a number of programs or instruction modules for execution by processing circuitry 406. In particular, storage 408 may store a device control module 412, mirror orientation module 414, and current mirror orientation module 416. The device control module 412 contains instructions or routines for controlling the devices connected to processor 300, e.g., camera 310 and actuator 320. The mirror orientation module 414 contains instructions for detecting faces, determining their positions in three-dimensional space, and calculating mirror orientations therefrom. The current mirror orientation module 416 contains instructions for determining the current or present orientation of mirror 40, which may be fed as input to mirror orientation module 414 to assist module 414 in determining amounts by which mirror 40 must be moved to achieve a desired new orientation. Mirror orientation module 414 may transmit these amounts to device control module 412 as commands instructing actuator 320 to re-orient mirror 40 accordingly.

The computing device 400 may be a local device physically located as shown in FIG. 1. However, embodiments of the disclosure are not limited to this configuration, and contemplate other implementations of computing device 400. For example, computing device 400 may be a local device in wired or wireless communication with camera 90 and actuator 70, or may be a remote computing device in communication with camera 90 and actuator 70 via an electronic communications network such as the public Internet. In such latter embodiments, mirror assembly 10 may include a wireless transceiver and/or a modem for electronic communication among camera 90, computing device 400, and actuator 70.

Figure 5:
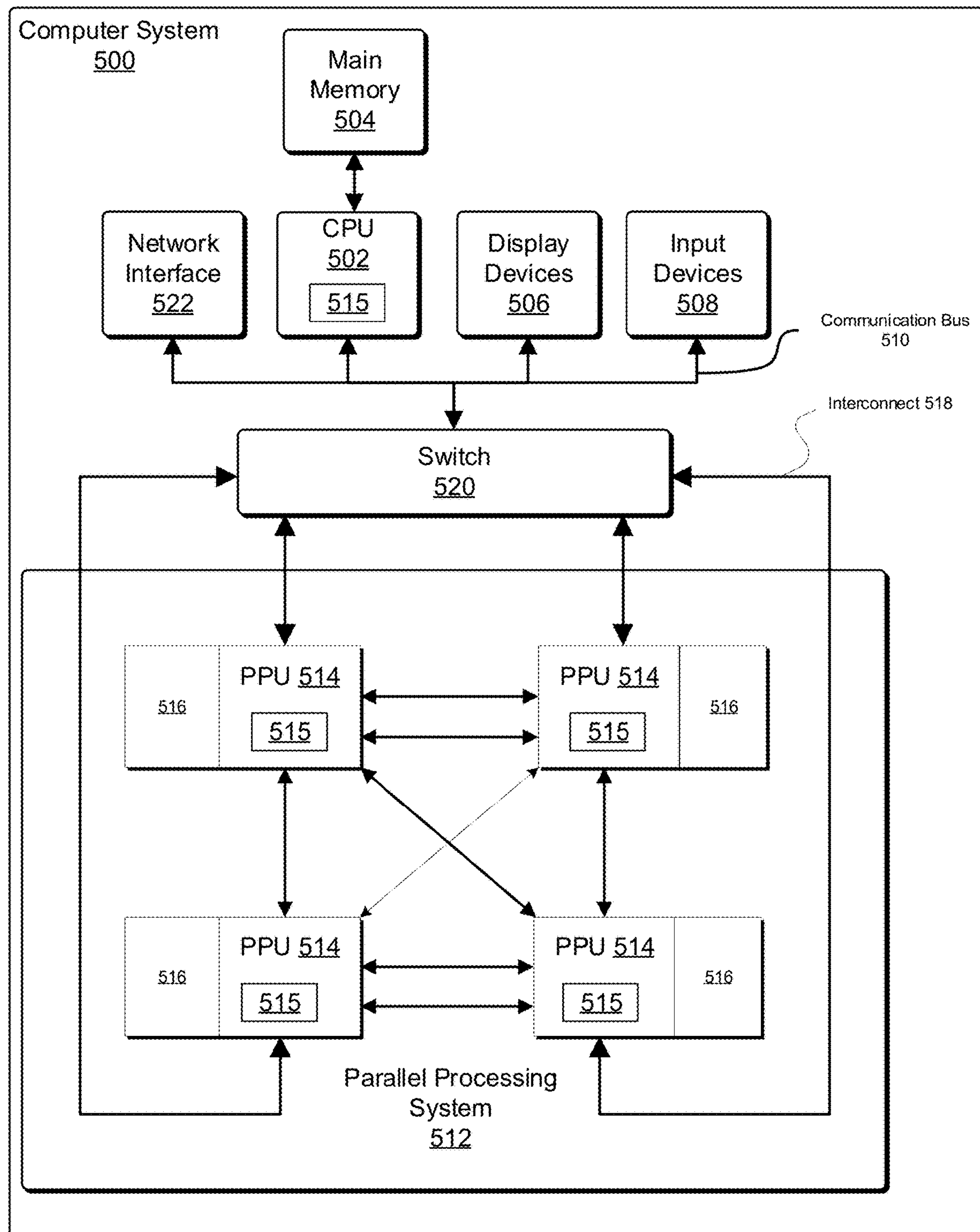
FIG. 5 is a generalized embodiment of a further processor constructed for use according to embodiments of the disclosure.

Computing device 400 may be any electronic computing device capable of calculating mirror orientations from driver or passenger images. For example, computing device 400 may be an embedded processor, a microcontroller, a remotely located desktop computer, tablet computer, or server in electronic communication with camera 90 and actuator 70, or the like. Furthermore, the computing device 400 may have any configuration or architecture that allows it to calculate mirror orientations from driver or passenger images and control actuator 70 accordingly. FIG. 5 illustrates one such configuration, in which computing device 400 is shown as a computer system 500 that is constructed with a parallel processing architecture for parallel processing of camera 90 image data. The computer system 500 of FIG. 5 may be employed, for example, in embodiments of the disclosure that use artificial intelligence-based methods and processes for determining face locations in images. In at least one embodiment, computer system 500 comprises, without limitation, at least one central processing unit ("CPU") 502 that is connected to a communication bus 510 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 500 includes, without limitation, a main memory 504 which may be any storage device, and control circuitry or logic (e.g., implemented as hardware, software, or a combination thereof). Data are stored in main memory 504 which may take the form of random access memory ("RAM"). In at least one embodiment, a network interface subsystem ("network interface") 522 provides an interface to other computing devices and networks for receiving data from and transmitting data to other systems from computer system 500. Logic 515 is used to perform computational operations associated with one or more embodiments, and may be any processing circuitry. In particular, logic 515 may include, without limitation, code and/or data storage to store input/output data, and/or other parameters for carrying out any computational operations. Logic 515 may also include or be coupled to code and/or data storage to store code or other software to control timing and/or order of operations. Logic 515 may further include integer and/or floating point units (collectively, arithmetic logic units or ALUs) for carrying out operations on retrieved data as specified by stored code. In at least one embodiment, any portion of code and/or data storage may be included with other on-chip or off-chip data storage, including a processor's L1, L2, or L3 cache or system memory.

In at least one embodiment, parallel processing system 512 includes, without limitation, a plurality of parallel processing units ("PPUs") 514 and associated memories 516. These PPUs 514 may be connected to a host processor or other peripheral devices via an interconnect 518 and a switch 520 or multiplexer. In at least one embodiment, parallel processing system 512 distributes computational tasks across PPUs 514 which can be parallelizable—for example, as part of distribution of computational tasks across multiple graphics processing unit ("GPU") thread blocks. Memory may be shared and accessible (e.g., for read and/or write access) across some or all of PPUs 514, although such shared memory may incur performance penalties relative to use of local memory and registers resident to a PPU 214. In at least one embodiment, operation of PPUs 514 is synchronized through use of a command such as_syncthreads( ) wherein all threads in a block (e.g., executed across multiple PPUs 514) are to reach a certain point of execution of code before proceeding.

Figure 6:
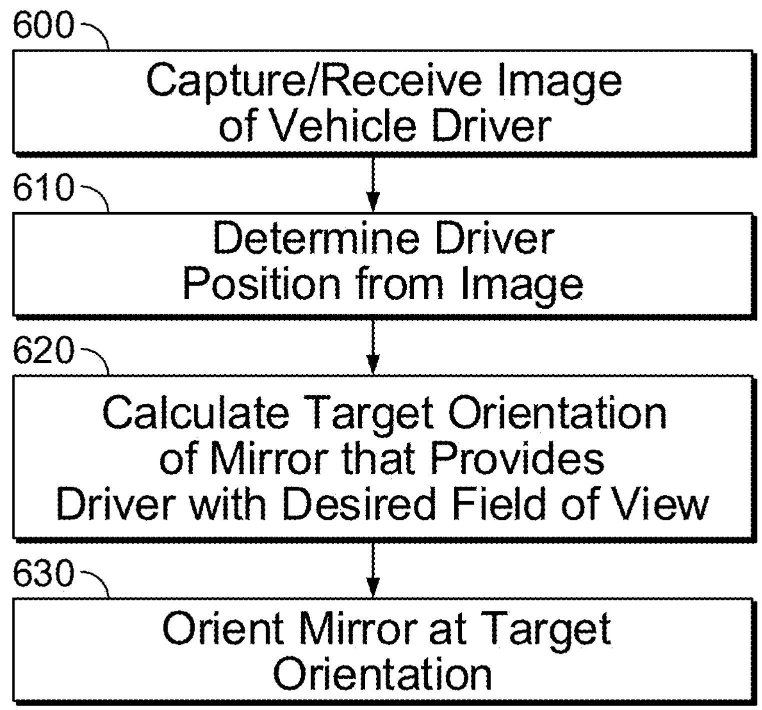
FIG. 6 is a flowchart illustrating process steps for determining mirror orientation in accordance with embodiments of the disclosure.

FIG. 6 is a flowchart illustrating process steps for determining mirror orientation in accordance with embodiments of the disclosure. In illustrative embodiments, the camera 90 captures images of the driver, although in alternate embodiments the camera 90 may capture images of any other vehicle passenger.

First, camera 90 captures an image of the vehicle driver, and transmits the corresponding image data to the computing device 80 (Step 600). The computing device 80 then determines the position of the driver from the image (Step 610). More specifically, the face of the driver within the image is located, one or more points on the driver's face are selected, and the spatial location(s) of these one or more points relative to the mirror 40 are determined. Driver faces may be located within an image using any method or process, including known computer vision-based face detection processes that detect faces without using neural networks, such as edge detection methods, feature searching methods, probabilistic face models, graph matching, histograms of oriented gradients (HOGs) fed into classifiers such as support vector machines, HaarCascade classifiers, and the like. Face location may also be performed using neural network-based facial recognition methods such as those employing deep neural network (DNN) facial recognition schemes, as well as any others. Embodiments of the disclosure also contemplate location of the driver's eyes from the same image. Eye location can be carried out in any manner, such as by known computer vision-based eye detection processes including any of the above non-neural network based techniques, neural network-based eye recognition methods, and the like.

Once the driver's face is located within the received image, one or more points on his or her face are selected. Any point(s) may be selected. In one embodiment, a point(s) at the geometric center of the identified face or its bounding box may be selected, or a point(s) at any other location on the identified face or within its bounding box may be picked. In alternate embodiments involving eye location, a point(s) between the two identified eyes may be selected, or one of the eyes may instead be selected.

The spatial location(s) of the selected point(s) may then be determined. Spatial location(s) may be determined or estimated in any manner, such as via tabulated locations corresponding to each pixel location and determined according to an estimation of distance such as a known distance between the mirror 40 and a point(s) near the driver's seat, or in any other manner.

Next, the computing device 80 calculates a target orientation of the mirror 40 which provides the driver with a desired field of view through the mirror 40 (Step 620). Calculation of mirror 40 target orientation is further explained below in connection with FIG. 8, and may be accomplished by any method or process for selecting a desired orientation of mirror 40. Once this target or desired orientation is determined, computing device 80 moves or re-orients mirror 40 to the target orientation (Step 630).

Steps 600-630 may be repeated at any times, to adaptively re-orient the mirror 40 in response to movement of driver 200 or any other passenger over time. For instance, Steps 600-630 may be repeated in response to a user command such as a button push or voice request, in response to any specified events such as vehicle engine ignition or a driver sitting in the driver seat, at regular intervals, or in any other manner. As a further example, Steps 600-630 may be repeated in response to a detected change in driver pose or position, or in response to a change in pose or position that exceeds some predetermined magnitude and/or some predetermined period of time. This latter example may avoid implementation of an overly sensitive mirror 40 that selfadjusts undesirably often, in response to even small or temporary driver movements. More specifically, prior to carrying out Step 630, mirror 40 may first determine whether the position or pose of the driver 200 determined at Step 610 has been held for at least some predetermined period of time. This predetermined time period may be of any duration. Further, the determination that a position or pose has been held or maintained for at least some period of time may be performed in any manner. For example, a pose may be estimated to have been held or maintained if any one or more locations on a detected face of driver 200 remain constant or substantially constant, e.g., constant within some predetermined range of location values, for at least the predetermined time period. This range may be of any value, such as a driver position determined to be constant within 6.0 inches in any direction, or the like.

It is noted that Step 630 may include other actions taken, in addition to re-orientation of mirror 40. As one example, processor 80 may be in electronic communication with one or more processors of the vehicle through electrical interface 60, to exchange various commands and data therewith. These may include commands to direct the vehicle to issue a warning or otherwise wake the driver 200 if the processor 80 determines that the driver is asleep or incapacitated. For instance, if at Step 610 the processor 80 determines that the located face of driver 200 is tilted at an excessive angle from vertical or is missing from the field of view of camera 90 for greater than some threshold length of time, the driver 200 may be deemed to be asleep or incapacitated. Processor 80 may then issue a command directing the vehicle to perform certain operations, such as issuing a warning to the driver 200, slowing or stopping the vehicle, engaging vehicle autopilot, or any other operations. As another example, the processor 80 may instruct the vehicle to adjust the seat position of the driver 200 or other passenger, to provide him or her with a better view from mirror 40. For instance, if at Step 610 the processor 80 determines that the located face of driver 200 has moved, the processor 80 may instruct the vehicle to adjust the seat position of driver 200 rather than, or in addition to, adjusting the orientation of mirror 40. For example, seat position may be adjusted to bring the face of driver 200 back to the same position it was in the previous captured image, or back to the position corresponding to the desired field of view for the current orientation of mirror 40.

Figure 7:
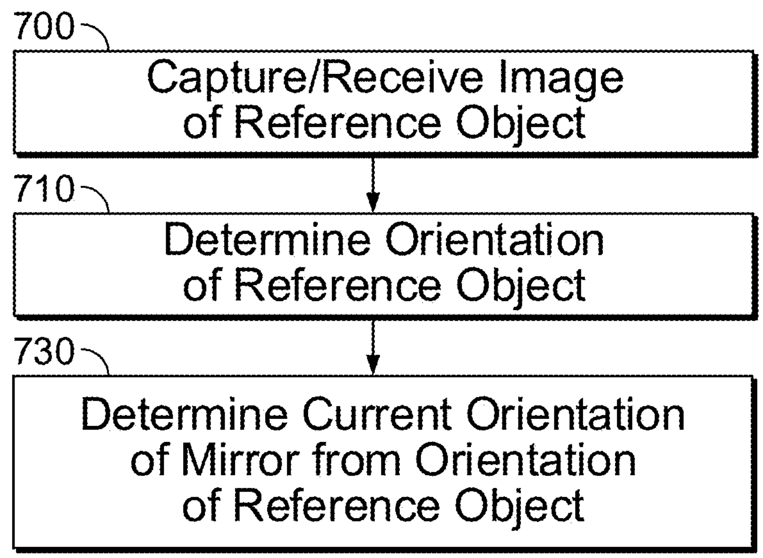
FIG. 7 is a flowchart illustrating process steps for dynamically adjusting mirror orientation in response to driver movement, in accordance with embodiments of the disclosure.

In some embodiments of the disclosure, knowledge of the current orientation of mirror 40 is required in order to determine how much the mirror 40 must be moved to achieve the new target orientation. Thus, embodiments of the disclosure encompass determination of mirror 40 current orientation before execution of Step 630. Determination of mirror 40 current orientation may be accomplished in any manner. FIG. 7 illustrates process steps for determining current mirror orientation in accordance with some embodiments. The process of FIG. 7 employs camera 90, auxiliary mirror 100, and pattern 110 to determine the current orientation of mirror 40. As above, and with reference to FIG. 2, auxiliary mirror 100 is angled and sized to reflect an image of pattern 110 onto a portion of the field of view of camera 90, so that camera 90 captures an image a portion of which is occupied by the reflected image of pattern 110. As can be observed by one of ordinary skill in the art, the pose of the reflected image of pattern 110 indicates the pose of mirror 40, as the pattern 110 is affixed to the mirror 40. Thus, the camera 90 first captures an image of a reference object attached to mirror 40, in this case pattern 110, where the image data are transmitted to computing device 80 (Step 700). The computing device 80 then determines the orientation of the reference object, i.e., pattern 110 (Step 710). Determination of reference object orientation may be determined in any manner. As one example, a pattern 110 whose apparent shape varies with orientation, such as a checkerboard or other patterned object, is affixed to a predetermined location on mirror 40. The shape of the pattern in the image captured by camera 90 thus indicates its pose or orientation, and thus also indicates the pose of mirror 40. Thus, computing device 80 determines the orientation of the reference object, or pattern 110 (Step 710), and then determines the current orientation of mirror 40 from the determined orientation of the reference object (Step 720).

Determination of reference object orientation from a captured image may be performed in any manner. In some embodiments of the disclosure, computer vision-based processes may be used to determine the shape of reference object features such as the colored squares of pattern 110. Such processes may be any computer vision-based processes, including any of the above described processes. The orientation of pattern 110 may then be determined from this shape, in known manner. Pattern 110 orientation may alternatively be determined in any other manner, such as by neural network-based shape recognition methods, a stored table of orientation values corresponding to each determined shape, or the like. Mirror 40 orientation may be determined from pattern 110 orientation in known manner, as pattern 110 is rigidly coupled to mirror 40.

Figure 8:
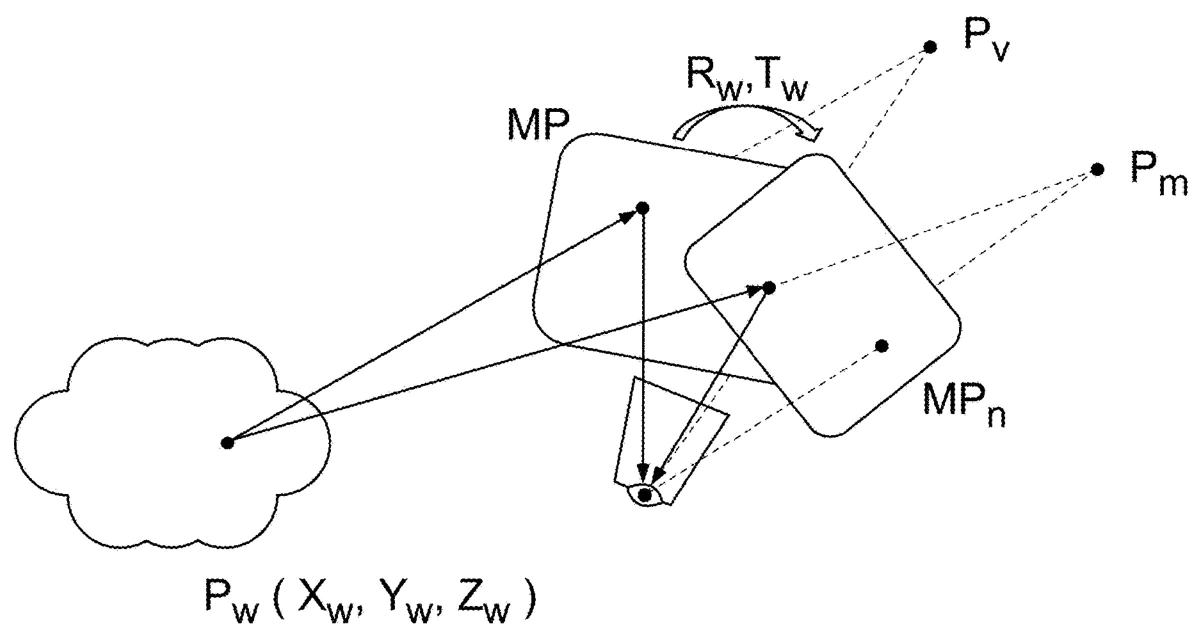
FIG. 8 conceptually illustrates calculation of mirror orientation in accordance with embodiments of the disclosure.

FIG. 8 conceptually illustrates calculation of mirror pose in accordance with embodiments of the disclosure. It is noted that embodiments of the disclosure contemplate determination of mirror pose from driver face location in any manner. FIG. 8 conceptually illustrates one exemplary process for determining mirror pose in moving a mirror from its current pose MP to a new pose $MP_n$. An arbitrary point $P_w(X_w, Y_w, Z_w)$ in the physical world, and in an eye coordinate system, has an original mirror virtual point $P_v$, or virtual point prior to movement of the mirror, that can be expressed as $$P_v = f_{reflection}(MP, P_w)$$

That is, the apparent location of the virtual point corresponding to $P_w$ is a reflection of point $P_w$ about mirror orientation MP. After re-orientation of the mirror by rotation $R_m$ and translation $T_m$, the new mirror pose may be expressed as:

$$MP_n = f_{transform}(MP, R_m, T_m)$$

That is, the new mirror pose is a function of the prior mirror pose, and the rotation $R_m$ and translation $T_m$ undergone. As the mirror shifts, so does the apparent position of $P_w$ as seen through the mirror. Accordingly, the new mirror virtual point is:

$$P_{vn} = f_{reflection}(MP_n, P_w)$$

Shifting the mirror changes the location at which the driver 200 must look to view mirror 40. Accordingly, change in mirror 40 orientations may alter the head pose of driver 200 somewhat. Accordingly, for on original head pose HP, the new head pose HPn and eye location $P_{en}$ after head transformation $(R_h, T_h)$ may be expressed as:

$$HP_n = f_{transform}(HP, R_h, T_h)$$

$$P_{en} = f_{head2eye}(HP_n)$$

The intersection point of $P_{vn}$ and $P_{en}$ is:

$$P_{in} = f_{intersection}(MP_n, P_{vn}, P_{en})$$

The orientation of point Pw as viewed by the driver's eye can be written as:

$$Ori_{PvnPen}=f_{orientation}(P_{vn},P_{en})$$

If the eye's visible envelope is defined as $E_e$ and the shape of mirror 40 is given as MS, then the visible field of view envelope from the mirror 40, $E_w$, is:

$$E_w=f_{envelope}(P_{vn},P_{en})$$

The field of view set, or all points in the field of view, is then:

$$FoVS=\{P_w|P_w\in R^3\cap Ori_{PvnPen}\in E_w\}$$

The desired field of view can then be expressed as an optimization formula:

$$\underset{R_m\in R^3,T_m\in T^3}{\mathrm{argmax}} FoVS=\{P_w \mid P_w\in R^3\cap Ori_{PvnPen}\in E_w\}$$

That is, the new mirror 40 orientation may be that which yields the largest field of view while still containing a selected point $P_w$ within the field of view. New mirror 40 orientation may thus be selected for a side view mirror by, for example, selecting a point $P_w$ on the side 210 of the vehicle, and carrying out the optimization formula above for a given eye location and current mirror 40 pose as determined from the above. Embodiments of the disclosure contemplate selection of any point $P_w$. As one example, point $P_w$ may be estimated from a known location on the side 210 of the vehicle and an approximated distance. As another example, point $P_w$ may be a predetermined point on the side 210 of the vehicle, where this predetermined point may be selected to provide, for instance, a specified amount of the side 210 of the vehicle within the field of view of the driver 200. For instance, a point along the side 210 of the vehicle may be selected as point $P_w$, and the new mirror orientation may be selected as the maximum field of view orientation containing $P_w$. Embodiments of the disclosure also contemplate use of any other constraints in solving this optimization problem. For example, the maximum field of view orientation may be selected from among those orientations containing $P_w$ in its field of view, and for which the side 210 of the vehicle occupies some predetermined threshold amount of the field of view, e.g., 25%, and which have a negative mirror 40 pitch angle. Any one or more constraints may be employed in solving the optimization formula herein, including a threshold field of view occupied by the side 210 of the vehicle, specified mirror 40 pitch and/or yaw values, specified ranges of any such values, or the like.

Optimization may be performed in any manner, such as by interpolating from a set of solved points, a solution method such as a known gradient descent method, or any other method of solving optimization problems.

It is noted that the methods and techniques of the disclosure can be applied to any other object besides a mirror 40. That is, any adjustable object may be made responsive to viewer movement in similar manner to that described herein. For example, any display in a vehicle may be made adjustable. Embodiments of the disclosure thus contemplate, for instance, placement of a camera in the vehicle to determine the pose or position of the driver or other passenger, and use of these determined driver/passenger poses or positions to direct a display screen at the driver/passenger. In this manner, a display screen such as a heads up display (HUD) may be kept directed at the driver and within a specified driver field of view, to reduce the amount that he or she must look away from the road while driving. Alternatively, an informational or entertainment-related screen may be kept directed at passengers for increased convenience. One of ordinary skill in the art will observe that methods and techniques of the disclosure may be employed to adjust any display screen, and indeed any object, in response to movement of any vehicle passenger or driver, to maintain any desired perspective.

One of ordinary skill in the art will also observe that pose or position may be determined in either two dimensions or three dimensions. As images captured by camera 90 are two dimensional, the location of driver 200 in two dimensions may be determined and used, perhaps along with an estimate of the third dimension. As described above, this estimate may be, for example, an estimation of the distance between mirror 40 and a position near the driver's seat. Alternatively, the three dimensional position of the driver 200 may be determined, such as via use of an additional camera 90, a range finding device for determining distances to driver 200, or the like. Determination of driver pose or position in three dimensions may result in more accurate mirror 40 orientation.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, current mirror orientation may be determined in any manner, whether through use of a reference object attached to the mirror or otherwise. Mirror systems of embodiments of the disclosure may be any vehicle mirror systems, including side view mirrors and rear view mirrors. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A system comprising:

a mirror articulable relative to a vehicle;

one or more cameras;

an actuator capable of adjusting the mirror to a target orientation; and control circuitry electronically coupled to the actuator, the control circuitry to:

receive, from the one or more cameras, image data depicting at least a portion of a driver of the vehicle and at least a portion of an object at a predetermined location, the object having an apparent shape in one or more views of at least one camera of the one or more cameras, the apparent shape varying with a current orientation of the mirror;

determine, from the image data, at least one position of the driver and the apparent shape of the object;

determine the current orientation of the mirror based at least on the apparent shape of the object;

determine a target orientation of the mirror based at least on the at least one position of the driver; and cause the actuator to position the mirror based at least on the target orientation and the current orientation of the mirror.

2. The system of claim 1, wherein the object is coupled to the mirror, and a second mirror is positioned to reflect an image of the object to the at least one camera.

3. The system of claim 2, wherein the one or more cameras are behind the mirror to capture the image data through the mirror and the driver is in front of the mirror.

4. The system of claim 1, wherein the object includes a static pattern affixed to the mirror.

5. The system of claim 1, wherein the determining the includes evaluating, using computer vision, reference object features depicted by the image data.

6. The system of claim 1, wherein an image represented by the image data depicts the driver and depicts the object on the mirror, and each of the at least one position of the driver and the orientation of the object is determined within the image.

7. The system of claim 1, wherein the determining the current orientation of the mirror includes determining, based least on the apparent shape of the object, a pose of the object in three-dimensional space, and determining the current orientation of the mirror based at least on the pose of the object.

8. The system of claim 1, wherein the object is coupled to the mirror so as to move with the mirror.

9. The system of claim 1:

wherein the control circuitry is to cause the actuator to position the mirror in response to the at least one position of the driver being maintained for at least a predetermined period of time.

10. A method comprising:

receiving, from one or more cameras, image data depicting at least a portion of an occupant of a vehicle and at least a portion of an object at a predetermined location, the object having an apparent shape in one or more views of at least one camera of the one or more cameras, the apparent shape varying with a current orientation of a mirror of the vehicle;

determining, from the image data, at least one position of the occupant and the apparent shape of the object;

determining the current orientation of the mirror of the vehicle based at least on the apparent shape of the object;

calculating a target orientation of the mirror based at least on the at least one position of the occupant; and causing the mirror to be oriented at the target orientation based at least on the current orientation of the mirror.

11. The method of claim 10, wherein the image data represents a plurality of images indicative of the occupant over time.

12. The method of claim 10, wherein the object comprises a static pattern.

13. The method of claim 10, wherein the mirror comprises a side view mirror and the target orientation is calculated based at least on including a portion of a side of the vehicle in a field of view of the occupant.

14. The method of claim 10, wherein the calculating the target orientation of the mirror includes determining an orientation difference between the current orientation and the target orientation, and wherein the causing is performed based at least on the orientation difference.

15. The method of claim 10, wherein the object is reflected into one or more fields of view of the one or more cameras using a second mirror on a same mirror assembly as the mirror.

16. The method of claim 10, wherein the target orientation is determined based at least on two or more visual reference points, one of the two or more visual reference points being on the occupant.

17. The method of claim 10, wherein the determining further comprises determining the at least one position of the occupant without using a neural network.

18. The method of claim 10, wherein the causing further comprises causing the mirror to be oriented at the target orientation in response to determining that the at least one position of the occupant has been maintained for at least a predetermined period of time.

19. A system comprising:

one or more circuits to control a mirror of a vehicle based at least on the one or more circuits:

receiving, from one or more cameras, image data depicting at least a portion of an occupant of the vehicle and at least a portion of an object at a predetermined location, the object having an apparent shape in one or more views of at least one camera of the one or more cameras, the apparent shape varying with a current orientation of the mirror;

determining, from the image data, at least one position of the occupant and the apparent shape of the object;

determining the current orientation of the mirror of the vehicle based at least on the apparent shape of the object;

calculating a target orientation of the mirror based at least on the at least one position of the occupant; and causing the mirror to be oriented at the target orientation based at least on the current orientation of the mirror.

20. The system of claim 19, wherein the calculating the target orientation of the mirror is based at least on the one or more circuits determining a threshold portion of the vehicle appears in a field of view of the occupant from the mirror.

21. The system of claim 19, wherein the mirror is one of: a side view mirror or a rear view mirror.

22. The system of claim 19, wherein a second mirror is positioned to reflect an image of the object to the one or more cameras used to generate the image data.

23. The system of claim 19, wherein the one or more circuits includes parallel processing circuitry.

24. The system of claim 19, wherein the one or more circuits is within the mirror of the vehicle.

25. The system of claim 19, wherein the causing the mirror to be oriented at the target orientation includes the one or more circuits using an actuator to position the mirror based at least on the target orientation after determining that the at least one position of the occupant has been maintained for at least a predetermined period of time.

* * * * *